United States Patent
White et al.

(10) Patent No.: US 8,479,864 B2
(45) Date of Patent: Jul. 9, 2013

(54) SYSTEM AND METHOD FOR DISABLING A VEHICLE

(75) Inventors: Craig William White, Grosse Pointe, MI (US); James Gregory Stanley, Novi, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 13/415,767

(22) Filed: Mar. 8, 2012

(65) Prior Publication Data

US 2012/0228047 A1  Sep. 13, 2012

Related U.S. Application Data

(60) Provisional application No. 61/451,082, filed on Mar. 9, 2011.

(51) Int. Cl.
   *B60K 28/06* (2006.01)

(52) U.S. Cl.
   USPC .......................................... 180/272; 340/576

(58) Field of Classification Search
   USPC ................. 180/272, 273; 280/735; 340/576, 340/561, 562, 426.11, 426.24; 701/45
   See application file for complete search history.

(56) References Cited

U.S. PATENT DOCUMENTS

| | | | | |
|---|---|---|---|---|
| 5,691,693 A | * | 11/1997 | Kithil | 340/439 |
| 5,743,349 A | * | 4/1998 | Steinberg | 180/272 |
| 6,229,908 B1 | | 5/2001 | Edmonds, III et al. | |
| 6,392,542 B1 | * | 5/2002 | Stanley | 340/561 |
| 7,151,452 B2 | * | 12/2006 | Shieh | 340/561 |
| 7,180,306 B2 | | 2/2007 | Stanley et al. | |
| 7,413,047 B2 | | 8/2008 | Brown et al. | |
| 7,796,017 B2 | * | 9/2010 | Kiribayashi | 340/425.5 |
| 7,859,423 B2 | * | 12/2010 | Yamanaka et al. | 340/667 |
| 7,956,730 B2 | * | 6/2011 | White et al. | 340/426.2 |
| 8,358,208 B2 | * | 1/2013 | Satz et al. | 340/561 |
| 2001/0045733 A1 | * | 11/2001 | Stanley et al. | 280/735 |
| 2009/0164069 A1 | * | 6/2009 | Yanagisawa | 701/45 |
| 2010/0036592 A1 | | 2/2010 | Osaki et al. | |
| 2010/0121502 A1 | * | 5/2010 | Katayama et al. | 701/1 |

FOREIGN PATENT DOCUMENTS

GB  2232284 A  * 12/1990
GB  2431496 A  *  4/2007

* cited by examiner

*Primary Examiner* — Ruth Ilan
*Assistant Examiner* — Darlene P Condra
(74) *Attorney, Agent, or Firm* — Foley & Lardner LLP

(57) ABSTRACT

A system for disabling the operation of a vehicle when a driver of a vehicle is seated in a vehicle seat. The system includes an alcohol detection sensor configured to be contacted by the driver and to generate a detection signal based on contact between the driver and the detection sensor. The system also includes a sensing electrode located proximate to the occupant and a sensing circuit configured to provide a sensing signal to the sensing electrode. A controller is provided to detect a change in the detection signal resulting from contact between the driver and the detection sensor. The controller is configured to disable the vehicle when either the blood alcohol concentration of the driver of the vehicle exceeds a threshold or the controller does not detect a change in the detection signal resulting from contact of the driver with the detection sensor.

18 Claims, 4 Drawing Sheets

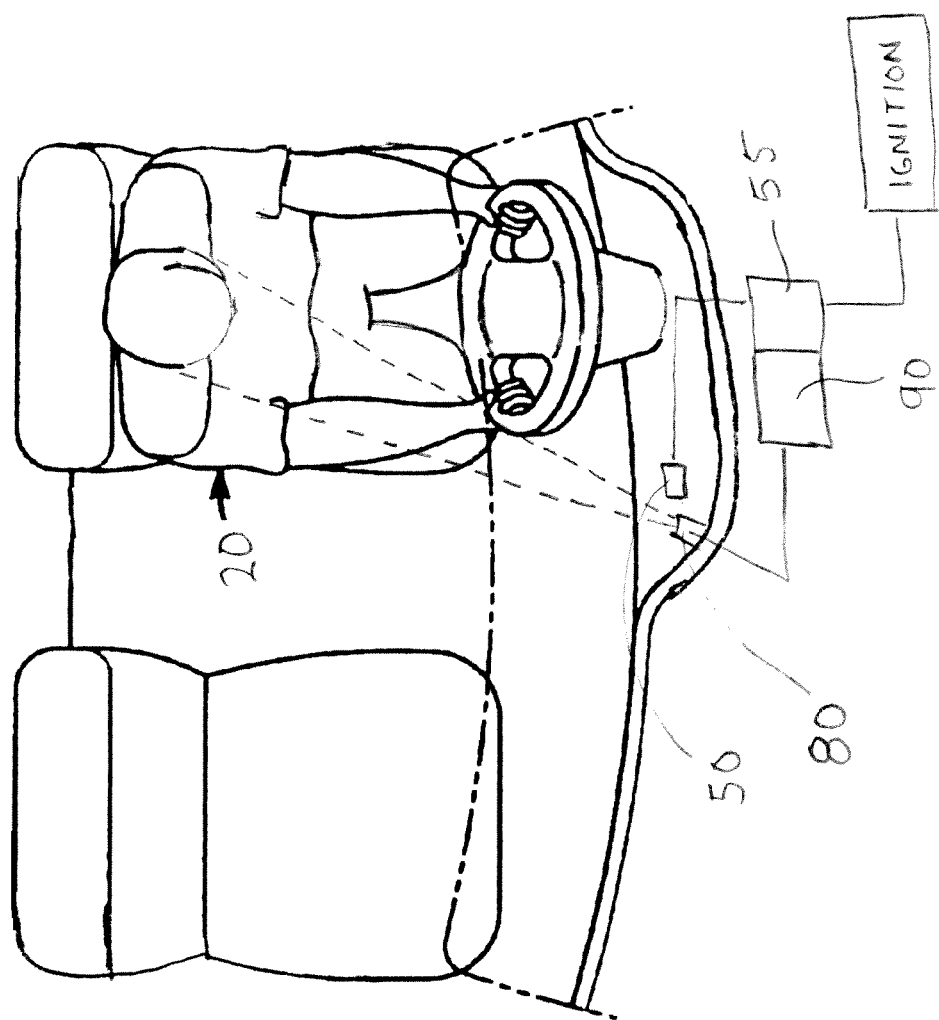

SYSTEM AND METHOD FOR DISABLING A VEHICLE

CROSS REFERENCE TO RELATED APPLICATIONS

The present application claims priority to and the benefit of U.S. Provisional Patent Application No. 61/451,082, entitled "Occupant Sensor System" and filed on Mar. 9, 2011. The foregoing provisional patent application is incorporated by reference herein in its entirety.

BACKGROUND

The present application relates generally to the field of driver alcohol detection systems.

In-car alcohol detection systems use various technologies to prevent a motor vehicle from moving if the driver registers a blood alcohol content above a predetermined threshold, such as 0.08 or greater. However, an intoxicated driver may be able to bypass the system by having a passenger or a bystander interface with the alcohol detection system.

There remains a need for an in-vehicle alcohol detection system with increased capabilities to screen out false readings given by an individual or device other than the driver.

BRIEF DESCRIPTION OF THE DRAWINGS

These and other features, aspects, and advantages of the present invention become apparent from the following description and the accompanying exemplary embodiments shown in the drawings, which are briefly described below.

FIG. 6 is an exemplary image captured by a camera mounted proximate to an alcohol detection system.

DETAILED DESCRIPTION

Several methods and systems are proposed to determine that the finger presented to an alcohol detection system in a vehicle is actually that of the driver of the vehicle (i.e., the person sitting in the driver seat).

According to one embodiment, a capacitive coupling system and the body of the driver as a conductive conduit are used to ensure that the finger touching the alcohol detection sensor is connected to the body that is sitting in the driver seat. Thus an overall system is constructed to include a device for finger based alcohol detection, and a modified seat integrated driver detection system.

In another embodiment, a camera and an image processing circuit is employed to determine whether the hand presented at the alcohol sensing detector, is in fact connected to the person in the driver seat. A very wide angle camera may be positioned in close proximity to the location of the alcohol detector so that the camera can view an image that includes both the hand presentation and a path back to the driver seat.

Figure 1:
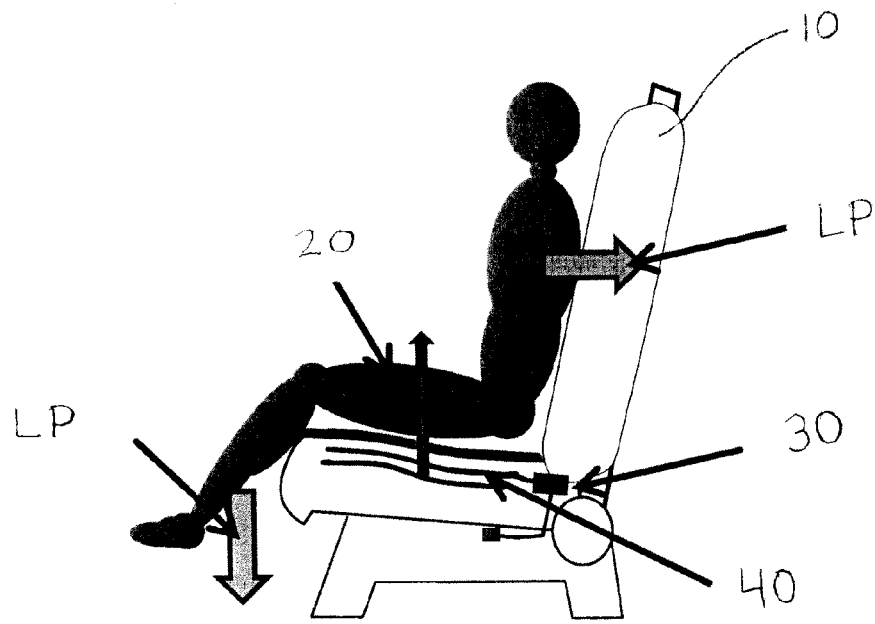
FIG. 1 is a schematic side view of a occupant in a vehicle seat including a capacitive type sensing system.

As shown in FIG. 1, a basic capacitive sensing system may include a sensing electrode 40 located in a vehicle seat 10. The sensing electrode 40 is connected to electronics that includes a sensing circuit and controller both typically located in a housing 30. The electronics includes a signal generator that provides a voltage signal (typically a sine wave) to the sensing electrode 40. Due to the applied voltage, a current flows in the electrode 40. The current in the electrode creates a corresponding electric field in the vicinity of the electrode 40. The interaction between surrounding objects and the electric field changes the effective impedance of the electrode and, as a result, current in the electrode can change due to the presence of objects in the vicinity of the electric field.

As shown in FIG. 1, the signal in the electrode can cause a current to flow from the electrode through the occupant to ground. For example, the signal is transmitted through the body of an occupant, if present, and is shunted off to ground through various leak paths (LP). The system includes electronics that can measures the resultant signal transfer or coupling as a change in amplitude and phase based on the strength of the coupling through the body. The capacitive occupant detection system may be, for example, a system such as disclosed in U.S. Pat. Nos. 6,392,542 and 7,180,306 (both incorporated by reference herein).

Figure 2:
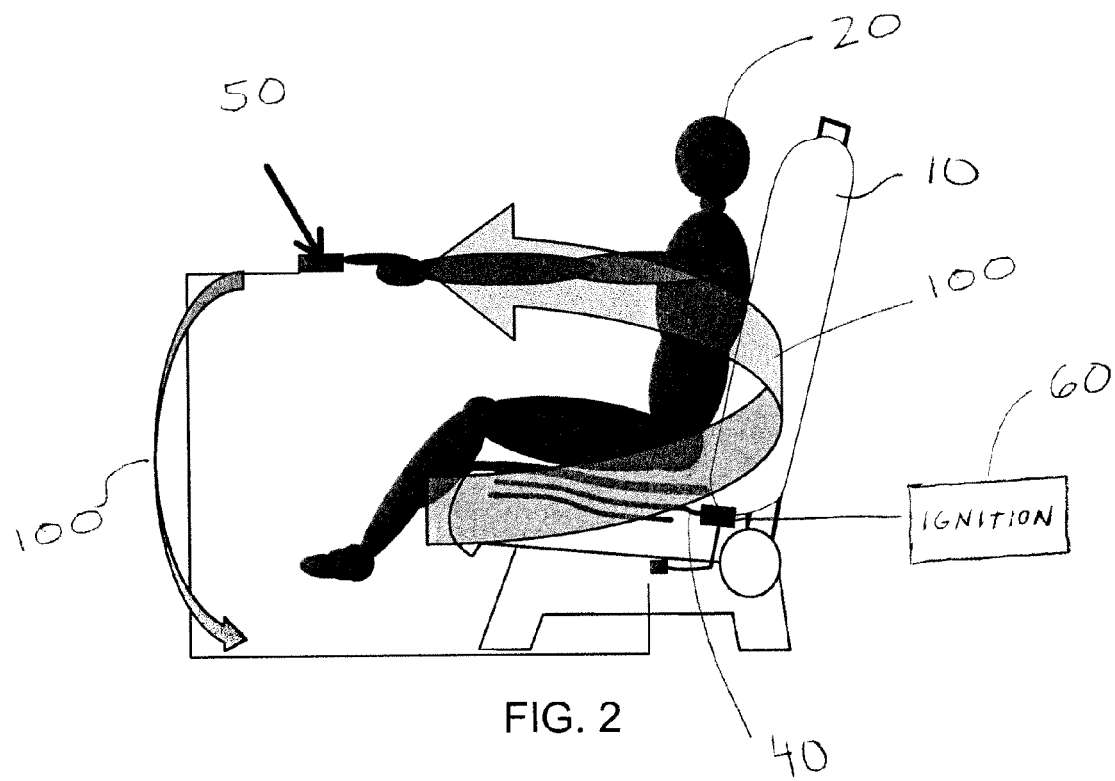
FIG. 2 is a schematic side view of the occupant of the vehicle seat in FIG. 1 further including an alcohol detection system.

As shown in FIG. 2, a blood alcohol detection system is provided. The blood alcohol detecting system includes a finger sensor 50 for sensing the finger of the vehicle driver. The results of the interaction between the finger sensor and the driver's finger are analyzed by a controller to determine the blood alcohol concentration of the driver. The sensor and alcohol detecting system may employ any of a number of known technologies. For example, the alcohol detection systems disclosed in U.S. Pat. Nos. 6,229,908, 7,413,047 and 2010/0036592 may be employed. Also, the scope of the present invention is not limited to the use of a finger sensor. For example, as disclosed in U.S. Pat. No. 7,413,047 the sensor may rely on the interaction between the driver's hand and the steering wheel of the vehicle.

The capacitive occupant detection system is used in conjunction with the alcohol detection system. The signal supplied to the sensing electrode is shunted off through various ground paths, but is also read at the sensing touch point (e.g., finger sensor 50, etc.) of the alcohol detection system. As shown in FIG. 2, there a conductive path (leakage path 100) is provided from the sensing electrode 40 through the sensor 50 and back to the processing electronics 30. The embodiments disclosed herein employ various methods and systems that utilize analyzing the characteristics of the current at a number of locations (e.g., current from the blood alcohol sensor or detector to the electronics, current in the electrode, etc.) in the leakage path 100 to ensure that the driver is the person interacting with the blood alcohol sensor.

The blood alcohol detection system and the capacitive sensing system may share some or all of the same electronics located in the module 30 (i.e., sensing and processing circuits and processor or controller). The vehicle disabling system disclosed in FIG. 2 provides a signal to the vehicle's ignition system 60 in order to disable the vehicle's ignition in the appropriate circumstances. The vehicle ignition may be disabled by opening a switch or relay, for example. Also, in a manner that may be known from existing disclosures, the vehicle disabling system disclosed herein may be configured to terminate operation of a running vehicle, in a controlled manner.

The vehicle disabling system includes features to ensure that the signal received at the touch point is actually from the driver seated in the seat containing the occupant detection system. For example, the signal provided to the sensing electrode may include a second signal is superimposed on top of a base carrier signal that would typically be used for a seat occupant detection system. This second superimposed signal may be varied, in a method known to those skilled in the art, to avoid easy duplication. The characteristics of the signal provided to the sensing electrode may be detected in the leakage path 100 to ensure that the occupant of the seat 10 is being monitored by the blood alcohol detection system.

The system is configured so that, in order to obtain a valid reading from the alcohol sensor, a driver must enter the vehicle and be seated. Exiting the vehicle causes the system to reset and require another alcohol measurement.

Additional checks or other processes may be included to reduce the likelihood of an occupant circumventing the alcohol detection system. According to one exemplary embodiment, the occupant detection system may include a signal strength plausibility check which would limit readings to a band of those predetermined to be consistent with normal seating. Thus, if the driver tried to couple further to a passenger's finger by holding the hand or other portion of a passenger, the additional shunting and signal change would cause the system to reject the signal. According to another exemplary embodiment, a second signal may be provided for the passenger seat (e.g., as provided by an occupant detection system for the passenger seat). The passenger seat may be conventional as shown in FIG. 6, for example. The passenger seat would include similar structure to that shown in FIG. 1, for example. This second signal may be configured to interfere with the signal from the driver seat occupant sensor system and cause the alcohol detection system to reject the signal.

Communication between the occupant detection system and alcohol detection system may be implemented in several ways.

According to one exemplary embodiment, the contact area of the finger sensor of the alcohol detection system is a conductor and can be grounded or floated. A wire, that is floated or grounded by the occupant detection system, is connected between the occupant detection system and the finger sensor. The occupant detection system then controls coupling between the finger and ground. When the occupant is touching the finger sensor, the current sensed by the occupant detection system (while working normally) will increase when the finger sensor is grounded and decrease when the finger sensor is floated (assuming the person sitting in the seat is touching the finger sensor). In this case this coupling can be encoded to pull out weak signals and ignore artificial signals (using, for example, a synchronous demodulator).

According to another exemplary embodiment, the contact area of the finger sensor is a conductor and can be grounded or floated. Digital communication is provided between the occupant detection system and the finger sensor module (e.g., single wire, CAN bus, etc.). With the correct input, the finger sensor module can ground or float the finger sensor conductor. The occupant detection system then controls coupling between the finger and ground. When the occupant is touching the finger sensor, the current sensed by the occupant detection system (while working normally) will increase when the finger sensor is grounded and decrease when the finger sensor is floated (assuming the person sitting in the seat is touching the finger sensor). In this case, this coupling can be encoded to pull out weak signals and ignore artificial signals (using some sort of synchronous demodulation).

In a similar way, the current from the driver seat occupant detection system can be monitored and the passenger side mat can be grounded/floated to identify if the passenger is connected to the driver (to disable the vehicle). In another embodiment, the passenger seat occupant detection system is monitored to determine if the passenger is somehow coupled to the finger sensor. If the passenger is coupled to the finger sensor, the vehicle is disabled.

According to another exemplary embodiment, the capacitive measurement is made from the finger sensor conductor and ground/float the mat in the driver seat. The current measurement from the finger sensor conductor is modulated by the grounding/floating signal from the finger sensor module. The electronics for the capacitive sensing function may be provided in the same enclosure as the finger sensor electronics. The mat in the seat is grounded or floated by direct coupling to ground through the harness or a mini-ECU that is controlled with a digital line to locally ground the seat mat when desired.

It should also be noted that this disclosure encompasses any concept where the driver is used as a signal coupling path from the finger sensing electrode to another location in the vehicle (a second electrode) that can be coupled, including the use of capacitive coupling, to the occupant. There are many ways described in the prior art to make the coupling measurement, including measurements of the signal current between the finger sensing electrode and second electrode. The second electrode could be in the seat, on the steering wheel, on the instrument panel, or anywhere else that can be conveniently coupled to the driver during vehicle start-up.

According to one embodiment, a system for disabling the operation of a vehicle when a driver of a vehicle is seated in a vehicle seat is provided. The system includes an alcohol detection sensor configured to be contacted by the driver and to generate a detection signal based on contact between the driver and the detection sensor. The system also includes a sensing electrode located proximate to the occupant. The sensing electrode may be located for example, in the vehicle seat, the steering wheel, the instrument panel, etc. The system includes a sensing circuit configured to provide a sensing signal to the sensing electrode thereby causing a current in the electrode. The sensing signal may be provided by a signal generator, such as, for example a sign wave generator. The sensing circuit is also configured to process the resulting current in the electrode in order to provide a signal representative of the current in the electrode to the system controller. As mentioned above, the signal processing may include methods for determining the phase and amplitude of the sensor current. Also, different current components may be analyzed after processing the current signal using conventional processing methods such as, for example, synchronous demodulation.

The system includes a controller configured to detect a change in the representative signal resulting from both the presence of the driver and contact between the driver and the detection sensor. The same (or a separate) controller may also be used to determine whether the blood alcohol content of the driver exceeds a threshold based on the detection signal retrieved from the blood alcohol detecting sensor. The threshold may be selected based on legal limits. For example, a threshold of 0.08 percent may be used. The controller is configured to disable the vehicle (via signal sent to the ignition system, for example) when either the change in the representative signal is not a result of the driver contacting the detection sensor or the blood alcohol content of the driver exceeds a threshold. Thus, the controller monitors the signal to determine whether the signal is exhibiting the expected characteristics of a signal consistent with the driver sitting in the seat and contacting the alcohol detection sensor (representative of the leakage current 100, described above)

As described above, the system may include electronics and including a controller that function to periodically ground the detection sensor. The representative signal should exhibit characteristics consistent with the periodically grounded sensor. If the representative signal does not exhibit the expected characteristics, the controller recognizes that the driver may not be in contact with the detection sensor. Accordingly, the controller may disable operation of the vehicle in such a situation.

In order to ensure that a passenger is not being substituted for the driver with the blood alcohol detector, the system may include a second sensing electrode located adjacent to the passenger seat. Preferentially, the second sensing electrode is located in the seat bottom of the passenger seat, in the same configuration shown in FIG. 1. The system may also include a second sensing circuit for providing a signal to the second sensing electrode and for providing a second signal that is representative of the current in the second sensing electrode. When the passenger contacts the blood alcohol detector the current in the second sensing electrode would change due to the leakage pass through the passenger and the blood alcohol sensor. The controller is configured to disable the vehicle when the change in the current through the electrode (as understood by the representative signal produced by the second sensing circuit) indicates that the passenger is contacting the blood alcohol detection sensor.

According to another embodiment, a system is provided where the signal received from the blood alcohol detection sensor is monitored to ensure that the driver is in contact with the detection sensor, and not a passenger of the vehicle. For example, the signal provided by the sensing circuitry to the sensing electrode may include both a primary and secondary signal. If the driver is in contact with the sensor, then the signal received from the blood alcohol detection sensor should include characteristics of both the primary and secondary signals. The system is configured to disable the operation of the vehicle if characteristics of both the primary and secondary signals are not present in the signal received from the blood alcohol detection sensor.

Figure 3:
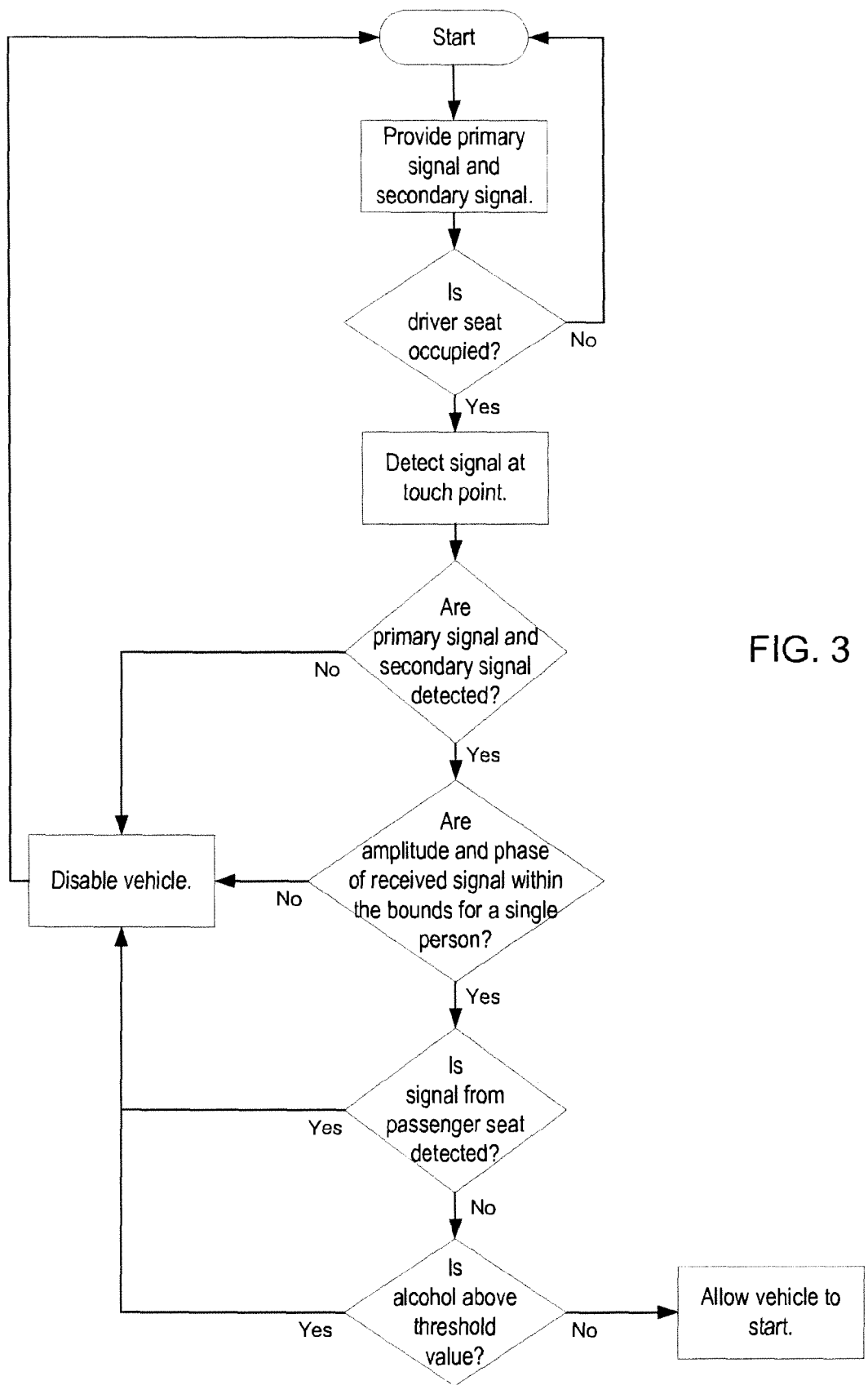
FIG. 3 is a flowchart of a system for starting a vehicle with an occupant detection system and an alcohol detection system according to an exemplary embodiment.

FIG. 3 includes a flow chart for an exemplary method of disabling operation of a vehicle based on detecting the blood alcohol content of the driver. FIG. 3 depicts a method that includes providing a signal to an electrode in the vicinity of the driver of the vehicle. The method also includes determining whether the driver seat is occupied. The exemplary method shown in FIG. 3 includes the optional additional step of considering whether the received signal (e.g., the signal representative of the current through the sensing electrode or the signal provided by the detection sensor) is within an expected range for a single person. This expected signal range (i.e., within bounds) may be monitored by considering the amplitude and phase of the signal, and may be used to detect the situation where the passenger actually touches the detection sensor while at the same time being in contact with the driver's body. If the passenger and driver are in contact a leakage path may be established that permits the sensed signal to include characteristics indicating that the driver is in contact with the sensor. However, the passenger may be the person contacting the sensor and not the driver. Thus, the step of evaluating whether the signal is within an expected bounds for a single person is useful to detect when a passenger and driver are attempting to circumvent the interlock that prevents the vehicle from being started or operating when the drivers' blood alcohol content exceeds a threshold.

FIG. 6 discloses an alternative embodiment of a system for disabling operation of the vehicle. The system includes an image capturing system and a blood alcohol detection and monitoring system. As shown in FIG. 6, the image capturing system is mounted to capture an image of the driver 20. A rear facing camera 80 is positioned proximate to location of the blood alcohol detection sensor 50. The system includes both a camera and signal processing electronics 90. The signal processing electronics 90 typically includes a microprocessor or controller contained in a module. The system is configured to determine whether the hand presented at the alcohol sensing detector 50, is in fact connected to the person in the driver seat. The camera 80 may include a wide angle lens positioned in close proximity to the surface of the alcohol sensor that is in contact with the driver. Preferably, the camera is positioned so that both the hand presentation and a path back to the driver seat may be clearly viewed. The blood alcohol detection sensor includes a controller, which may be integrated with the controller for the imaging system. The controller(s) are configured to interact with the vehicle's ignition, for example, to control or disable operation of the vehicle.

Figure 5:
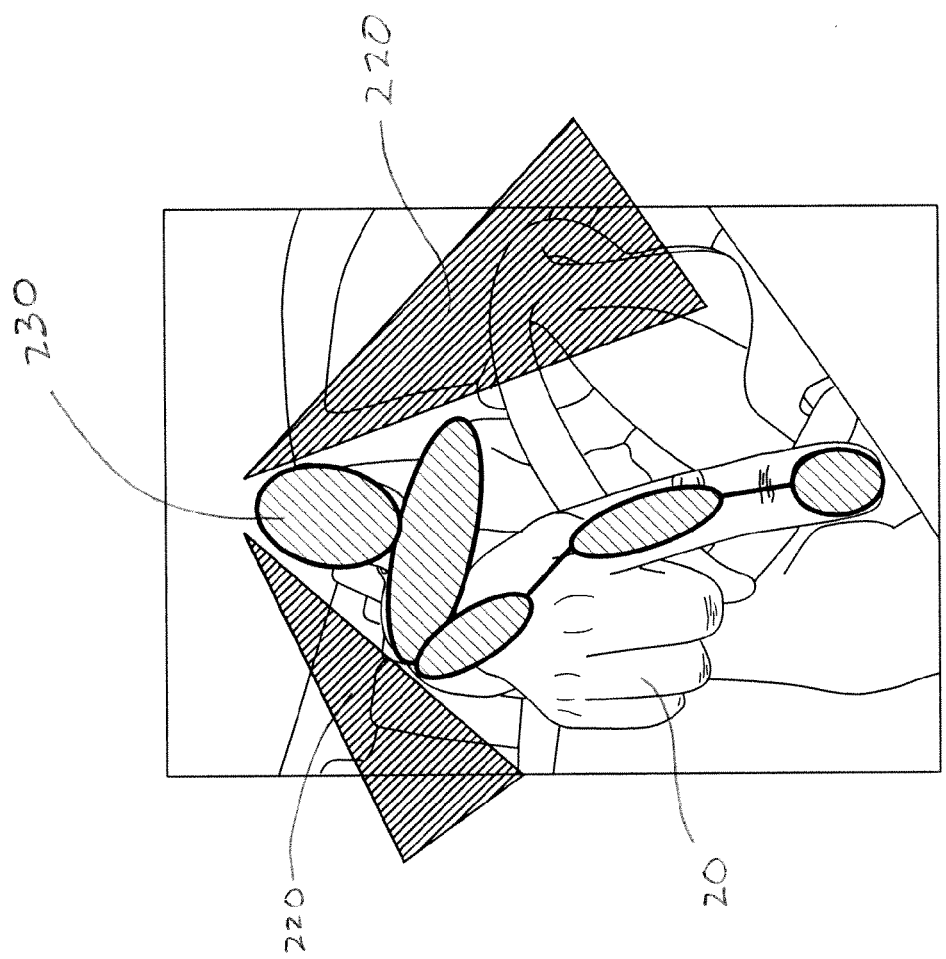
FIG. 5 is an exemplary image captured by a camera mounted proximate to an alcohol detection system, showing features associated with image processing overlaid on the captured image.
Figure 4:
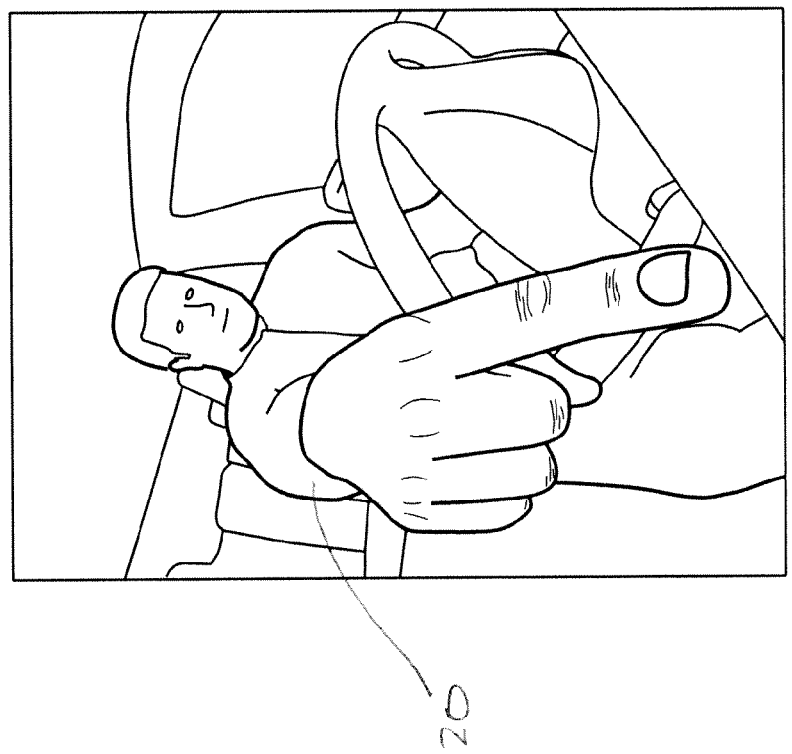
FIG. 4 is an exemplary image captured by a camera mounted proximate to an alcohol detection system.

The image signal captured by the camera is processed. FIG. 4 shows a representation of a possible image to be captured by the camera 80. As shown in FIG. 5, for example, the image processing may include conventional techniques for element analysis of the image to identify shapes 230 in the image. For example, the shapes, position, and motion of each image (or parts of the image) may be analyzed on a frame by frame basis to determine the head in relation to the seat and vehicle interior, and to track movement of the arm and hand elements toward the sensing head to determine overall connectivity. Thus, the camera may produce video or still images. In addition, a warning zone(s) 220 may be constructed around the driver position in order to detect other motion within the field of view. An intrusion into the warning zone 220 may be interpreted as another person (e.g., a bystander or passenger) in close proximity to the driver. The warning zone 220 is created because of the concern that the intruding person is attempting to contact the alcohol sensing detector instead of the driver. If an intrusion occurs operation of the vehicle may be disabled. The camera may include be a two dimensional or mono camera or may be enhanced using a three dimensional camera and associated additional processing.

As described above, an image capturing system (e.g., a camera) and a blood alcohol detection sensor may be used together to create a system for disabling operation of a vehicle. The system may include a camera positioned to capture an image of the driver and an alcohol detection sensor located proximate to the driver. The image captured by the camera may be analyzed by a controller to determine if a portion of the driver's body is in contact with the blood alcohol detection sensor. Thus, according to this exemplary system a controller would disable operation of the vehicle when it is determined that either a portion of the driver's body is not contact with the detection sensor while a detection signal is being generated or the blood alcohol content of the driver exceeds a threshold.

The analysis of the image (or series of images) captured by the camera could include determining whether an object has intruded into an area in close proximity to the driver. If an intrusion is determined to have occurred, the vehicle may be disabled to prevent operation. This analysis is attempting to detect a passenger contacting the blood alcohol sensor in an attempt to fool the system into thinking the driver is in contact.

Although specific shapes and locations of each element have been set forth in the drawings, each element may be of any other shape or location that facilitates the function to be performed by that element. For example, the cameras and light sources have been shown in particular vehicle locations; however, in other exemplary embodiments the sensing elements may be located anywhere in the vehicle.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

Exemplary embodiments may include program products comprising computer or machine-readable media for carrying or having machine-executable instructions or data structures stored thereon. For example, the driver monitoring system may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present subject matter.

What is claimed is:

1. A system for disabling the operation of a vehicle when a driver of a vehicle is seated in a vehicle seat comprising:
   an alcohol detection sensor configured to be contacted by the driver and to generate a detection signal based on contact between the driver and the detection sensor;
   a sensing electrode located proximate to the driver;
   a sensing circuit configured to provide a sensing signal to the sensing electrode thereby causing a current in the electrode;
   wherein the sensing circuit is configured to provide a signal representative of the current in the electrode;
   a controller configured to detect a change in the representative signal resulting from both the presence of the driver and contact between the driver and the detection sensor; and
   wherein the controller is configured to determine whether the blood alcohol content of the driver exceeds a threshold based on the detection signal and is configured to disable the vehicle when either the change in the representative signal is not a result of the driver contacting the detection sensor or the blood alcohol content of the driver exceeds a threshold.

2. The system of claim 1, wherein the sensing circuit is configured to periodically ground the detection sensor so that the controller can detect whether the representative signal exhibits the expected characteristics resulting from the grounded sensor when the driver is in contact with the detection sensor.

3. The system of claim 1, wherein the sensing circuit includes a synchronous demodulation circuit for generating the representative signal.

4. The system of claim 1, wherein the controller includes a processor for determining blood alcohol content and a second processor for determining the presence of the driver.

5. The system of claim 1, further comprising an occupant detection system for a passenger seat of the vehicle and wherein the passenger seat occupant detection system comprises a second sensing electrode located in a passenger seat of the vehicle and a second sensing circuit configured to provide a second sensing signal to the second sensing electrode to thereby generate current in the second sensing electrode; and wherein the second sensing circuit is configured to provide a second signal representative of the current in the second electrode; and a second controller configured to detect a change in the second representative signal resulting from the contact between the driver and the detection sensor; and wherein the second controller is configured to disable the vehicle when the change in the second representative signal results from the passenger contacting the detection sensor.

6. The system of claim 1, wherein the sensing electrode is located in the driver's seat of the vehicle.

7. The system of claim 1, wherein the controller is configured to disable operation of the vehicle if the controller does not detect the presence of the driver.

8. The system of claim 1, wherein the sensing circuit provides primary and secondary signals as the sensing signal.

9. The system of claim 1, wherein the controller is configured to determine whether the representative signal is in an expected range of values.

10. A system for disabling the operation of a vehicle when a driver of a vehicle is seated in a vehicle seat comprising:
    an alcohol detection sensor configured to be contacted by the driver and to generate a detection signal based on contact between the driver and the detection sensor;
    a sensing electrode located proximate to the driver;
    a sensing circuit configured to provide a sensing signal to the sensing electrode;
    a controller configured to detect a change in the detection signal resulting from contact between the driver and the detection sensor; and wherein the controller is configured to disable the vehicle when either the blood alcohol concentration of the driver of the vehicle exceeds a threshold or the controller does not detect the change in the detection signal resulting from contact of the driver with the detection sensor.

11. The system of claim 10, further comprising a second sensing electrode located in a passenger seat of the vehicle; and a second sensing circuit for providing a second sensing signal to the second sensing electrode; wherein the controller is configured to analyze the detection signal and disable operation of the vehicle when the controller determines the presence of characteristics of the second sensing signal in the detection signal.

12. The system of claim 10, wherein the sensing circuit is configured to provide primary and secondary sensing signals to the sensing electrode and wherein the controller is configured to analyze the detection signal to determine the presence of characteristics of both the primary and secondary signals.

13. The system of claim 10, wherein the sensing circuit is configured to periodically ground the detection sensor so that the controller can detect whether a change in the received detection signal results from the driver contacting the detection sensor.

14. A method of disabling a vehicle based on the blood alcohol concentration of the driver of the vehicle, wherein the vehicle includes a sensing electrode located in a driver's seat and an alcohol detection sensor located proximate to the driver, the method comprising the steps of:
    providing a sensing signal to the sensing electrode;
    receiving a detection signal from the detection sensor;
    analyzing the received detection signal to determine the presence of characteristics of the sensing signal;
    determining the blood alcohol content of the driver based on the detection signal provided by the detection sensor;
    disabling the vehicle when either characteristics of the sensing signal are not detected or the blood alcohol content of the driver exceeds a threshold.

15. The method of claim 14, wherein the vehicle further includes a second sensing electrode located in a passenger seat of the vehicle and the method further comprises the steps of:
    providing a second sensing signal to the second sensing electrode;
    analyzing the received detection signal to determine the presence of characteristics of the second sensing signal;
    disabling operation of the vehicle if the analysis of the received detection signal indicates the presence of characteristics of the second sensing signal.

16. The method claim 14, wherein the step of providing a sensing signal includes providing primary and second sensing signals and wherein the analyzing step includes analyzing the received detection signal to determine the presence of both the primary and secondary signals.

17. The method of claim 14, further comprising the step of periodically grounding the detection sensor so that the controller can detect whether a change in the received detection signal results from the driver contacting the detection sensor.

18. A method of disabling a vehicle based on the blood alcohol concentration of the driver of the vehicle, wherein the vehicle includes a sensing electrode located in a driver's seat and an alcohol detection sensor located proximate to the driver, the method comprising the steps of:
    providing a sensing signal to the sensing electrode to thereby generate a current in the electrode;
    receiving a detection signal from the detection sensor;
    analyzing the current in the electrode to determine whether the driver is contacting the detection sensor;
    determining the blood alcohol content of the driver based on the detection signal provided by the detection sensor;
    disabling the vehicle when it is determined that either the driver is not contacting the detection sensor or the blood alcohol content of the driver exceeds a threshold.

* * * * *